US011461436B1

(12) United States Patent
Balmakhtar et al.

(10) Patent No.: US 11,461,436 B1
(45) Date of Patent: Oct. 4, 2022

(54) TRUST ZONE HOSTED SECURE SCREEN MODE FOR DISCRETIONARY PRESENTATION OF SENSITIVE CORPORATE INFORMATION TO TRUSTED ENDPOINTS

(71) Applicant: T-MOBILE INNOVATIONS LLC, Overland Park, KS (US)

(72) Inventors: Marouane Balmakhtar, Fairfax, VA (US); Thomas Golden, Purcellville, VA (US); Galip Murat Karabulut, Vienna, VA (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 17/149,440

(22) Filed: Jan. 14, 2021

(51) Int. Cl.
*G06F 21/71* (2013.01)
*G06F 21/16* (2013.01)
*G06F 21/53* (2013.01)

(52) U.S. Cl.
CPC ............. *G06F 21/16* (2013.01); *G06F 21/53* (2013.01); *G06F 21/71* (2013.01); *G06F 2221/032* (2013.01); *G06F 2221/0735* (2013.01); *G06F 2221/2141* (2013.01)

(58) Field of Classification Search
CPC .......... G06F 21/10; G06F 21/16; G06F 21/53; G06F 21/62; G06F 21/71; G06F 21/84; G06F 2221/032; G06F 2221/0722; G06F 2221/0724; G06F 2221/0733; G06F 2221/0735; G06F 2221/2141
See application file for complete search history.

(56) References Cited

U.S. PATENT DOCUMENTS

| 8,370,431 | B1* | 2/2013 | Wang ................. G06F 21/6218 709/204 |
| 9,282,898 | B2 | 3/2016 | McRoberts et al. |
| 11,100,197 | B1* | 8/2021 | Bernardi ................ H04L 9/085 |
| 2014/0215356 | A1* | 7/2014 | Brander ................ H04W 12/02 715/753 |
| 2021/0297629 | A1* | 9/2021 | Lemes da Silva ... G06K 9/6256 |
| 2022/0078194 | A1* | 3/2022 | Grover ................ H04L 63/0457 |

\* cited by examiner

*Primary Examiner* — Minh Dinh

(57) ABSTRACT

A communication device. The communication device comprises a central processing unit (CPU), a graphics processing unit (GPU), and a non-transitory memory comprising executable instructions for a sharing application that when executed by at least one of the CPU or the GPU, causes the sharing application to transmit an executable of a trusted application to an endpoint communication device, begin execution of the sharing application in a trusted security execution zone (TSZ) execution mode for sharing media content, instantiate a trustlet application that begins execution by the CPU or the GPU in the TSZ execution mode, display a unit of media content on the communication device, determine whether the unit of media content comprises confidential information, and in response to a determination the unit of media content comprises confidential information, transmit commands to the trusted application to control one or more functions at the endpoint communication device.

20 Claims, 7 Drawing Sheets

TRUST ZONE HOSTED SECURE SCREEN MODE FOR DISCRETIONARY PRESENTATION OF SENSITIVE CORPORATE INFORMATION TO TRUSTED ENDPOINTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A web conference session between a host and remotely located participants may be used to share media content by the host with the invited participants. For example, media content such as a PowerPoint® presentation, a video, or another document may be sent by the host at a host electronic device to one or more endpoint electronic devices of the participants during a conference session in order to share the media content. The media content may be shared directly by the host or the media content may be sent to a web conferencing server during the conference session, which then shares the media content to endpoint electronic devices of the participants. The web conferencing server may receive a stream of the media content and creates copies to be sent to the endpoint electronic devices of the participants during the session. The web conferencing server uses screen-sharing at the host electronic device to share the media content. Each endpoint electronic device may adjust the resolution of the media content or request a lower resolution copy from the originating host electronic device or the web conferencing server.

The media content that is shared is displayed on a display using a graphics processing unit (GPU). A GPU is a specialized electronic circuit designed to rapidly manipulate and alter memory to accelerate building of images intended for output on the display. A GPU can complete graphics processing tasks more quickly and more efficiently than a central processing unit (CPU) can due to its possession of a highly parallel structure. The parallel structure of the GPU allows large blocks of data to be processed in parallel. An electronic device comprising a CPU and a GPU is likely to delegate graphics processing to the GPU rather than to the CPU in order to take advantage of the parallel processing advantage provided by the structure of the graphics processing unit.

SUMMARY

In an embodiment, a communication device is disclosed. The communication device comprises a central processing unit (CPU), a graphics processing unit (GPU), and a non-transitory memory comprising executable instructions for a sharing application. The executable instructions are executed by at least one of the CPU or the GPU, which causes the sharing application to transmit an executable of a trusted application to an endpoint communication device; begin execution of the sharing application in a trusted security execution zone (TSZ) execution mode for sharing media content with the endpoint communication device; in response to execution of the sharing application, instantiate a trustlet application that begins execution by the CPU or the GPU in the TSZ execution mode; display a unit of media content on a display device of the communication device; determine whether the unit of media content comprises confidential information; and in response to a determination the unit of media content comprises confidential information, transmit one or more commands to the trusted application at the endpoint communication device, wherein the one or more commands is configured to control one or more functions at the endpoint communication device.

In another embodiment, a method implemented by a communication device is disclosed. The method includes transmitting an executable of a trusted application to an endpoint communication device; beginning execution of a sharing application in a trusted security execution zone (TSZ) execution mode for sharing media content with the endpoint communication device; in response to execution of the sharing application, instantiate a trustlet application that begins execution by a central processing unit (CPU) or a graphics processing unit (GPU) in the TSZ execution mode; displaying a unit of media content on a display device of the communication device; determining whether the unit of media content comprises confidential information; and in response to a determination the unit of media content comprises confidential information, transmitting one or more commands to the trusted application at the endpoint communication device, wherein the one or more commands control one or more functions at the endpoint communication device.

In yet another embodiment, a user communication device is disclosed. The user communication device includes at least one of a central processing unit (CPU) or a graphics processing unit (GPU); a non-transitory memory comprising executable instructions for a sharing application that, when the executable instructions are executed by at least one of the CPU or the GPU, causes the sharing application to receive a communication comprising a meeting request from a host communication device; store a meeting link comprising an executable of a trusted application in memory of the user communication device based on selecting the meeting request; select the meeting link to instantiate the trusted application at the user communication device; receive, from the host communication device, a unit of media content for display on a display device of the user communication device; receive one or more commands in response to receiving the unit of media content, wherein the one or more commands is configured to control one or more functions of at least one of the CPU or the GPU.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
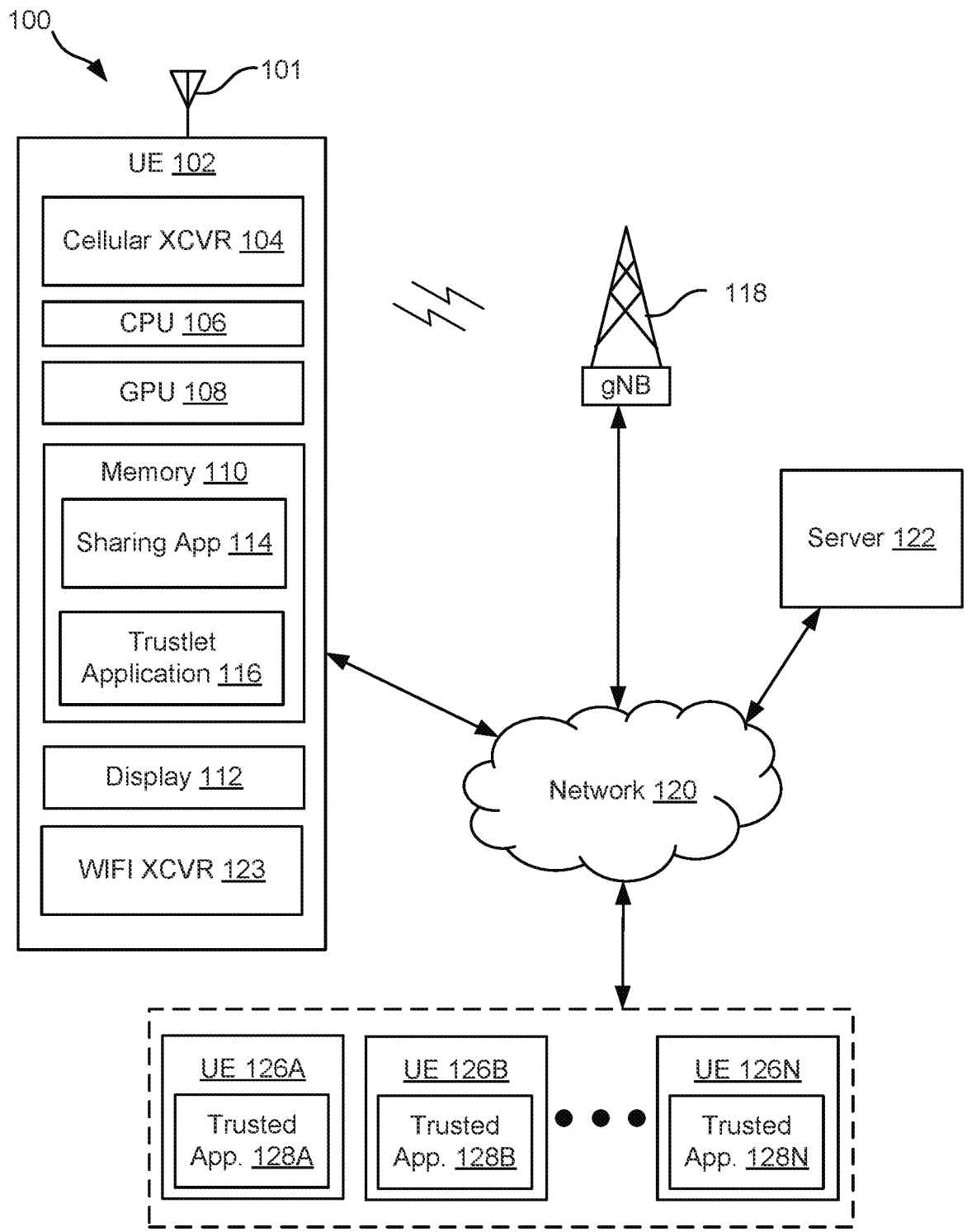
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, a host communication device (i.e., an electronic device) can share media content with one or more endpoint communication devices during a conference session using a screen-sharing mode of a sharing application. The host communication device and the endpoint communication devices can be a mobile phone, a personal digital assistant, a media player, a desktop computer, a laptop computer, a tablet computer, a gaming system, a television set, or another electronic device. Each of these devices may present images of the media content on a display. The communication devices may implement a graphics processing unit (GPU) in order to meet graphics processing demands associated with presenting images on the display. The media content can be a PowerPoint® presentation, a video, a portable document format (pdf) document, or other similar still or moving images. In the screen sharing mode, the endpoint communication devices may be remotely located (e.g., in different geographic location than the host communication device) and can view any content that is being presented on a display of the host communication device. The sharing application may be a web conference application, a video conference application, or another application that permits screen sharing. In one instance, the media content may be directly shared through the sharing application between the host communication device and the endpoint communication devices. In another instance, the media content may be sent to a web conferencing server, which then shares copies of the media content to the endpoint communication devices that are authorized to receive the media content through a sharing application.

There are various circumstances in which it is desirable to share screens among different participants but control the media content that is presented during a sharing session. It may be desirable to show media content of a POWER-POINT slide or a page of a portable document format (pdf) file to some participants of a sharing session while blocking the same content to other participants of the sharing session. Additionally, it may be desirable to provide functions during the sharing session that prevent capturing the content of the screen by some participants of a group such as, for example, prevent capturing content using various software utility applications such as screen print, screen capture, or snip. The disclosure herein discloses a system that can provide these functions.

During a conference session, a host user at the host communication device may be sharing corporate sensitive and/or confidential information (hereinafter "confidential information") in a web conference with participant users connected via endpoint communication devices. The participant users are authorized to participate in the web conference. In the web conference, some participant users are authorized to view the confidential information ("qualified participant users") while other participant users are not authorized to view the confidential information ("non-qualified participant users"). Additionally, the non-qualified users that can view the confidential information may capture portions of the confidential information using a screen capture utility application at the endpoint communication devices for dissemination to other entities. This sharing of confidential information with non-qualified users and external users can compromise the security and integrity of data for a corporate entity.

A sharing application may execute in the context of a trustlet application at a host communication device that shares media content with all participants of a sharing session but blocks critical or confidential information in the media content from non-qualified participants who are not qualified to see the confidential information. The trustlet application may execute on the GPUs of communication devices of participant users that are logged into a sharing application during the sharing session. The trustlet application can determine that a unit of media content (e.g., a slide of a POWERPOINT presentation or a page of a PDF file) is viewable by all participants and shares that unit of media content will all participants to a sharing session. Further, the trustlet application can determine that a different unit of media content contains confidential information, and can selectively block sharing of that confidential information from non-qualified participants (for instance, block sending the confidential content to the communication devices of the non-qualified participants or send commands that the confidential content is obfuscated at the communication devices of the non-qualified participants). The trustlet application can block utility applications of the communication devices which might be used to capture screens or pages of content, for example by disabling screen print utilities, screen capture utilities, and snipping utilities. The trustlet application can further superimpose a watermark in the media content, which may be invisible to a participant user viewing the media content, that can be displayed in an image that is captured by a camera of a smart device or other similar device of a display screen of the communication device in the sharing session. If the image created by the smart device is later distributed, the watermark could be extracted and would identify the communication device in the sharing session and hence the session participant who disclosed the media content.

Disclosed herein is a system with a host communication device and endpoint communication devices that addresses the problem of maintaining the security of confidential information. The host communication device shares media content comprising confidential information with endpoint communication devices using a sharing application during a web conference. The media content may include portions that may not be viewable by an endpoint communication device of a non-qualified participant user. The sharing application may be a web conference application, a video conference application, or the like. The sharing application initiates a trustlet application to execute in a trusted security zone (TSZ) execution mode on the host communication device during the web conference session. The trustlet application transmits an executable of a trusted application to the endpoint communication devices when the endpoint communication devices select a link to join the web conference. Alternatively, the host communication device may send a link directly to the endpoint communication device during the web conference. The executable of the trusted application is installed as a trusted application in order to connect the endpoint communication device to the web conference.

During the web conference, the trustlet application monitors the sharing application to determine the media content being presented/shared. The trustlet application may send instructions/commands to the trusted application at endpoint communication devices to control the CPU and the GPU at the endpoint communication devices during the web conference session when confidential information is shared at the host communication device. In other embodiments, the trustlet application may send instructions/commands to the trusted application at endpoint communication devices to control the CPU and the GPU when any information is shared by the host communication device. In embodiments, the trustlet application sends commands that instruct the GPU at the endpoint communication devices to obfuscate one or more pages of a document/presentation comprising confidential information for non-qualified participant users being displayed at the endpoint communication device, instructs the CPU to disable screen capture utilities or other snipping utilities, and insert watermarks into each page comprising the confidential information. In an embodiment, a system with the communication devices in the present application may be user equipment (UE) such as, for example, a mobile phone, a personal digital assistant, a media player, desktop computer, a laptop computer, a tablet computer, a gaming system, a television set, or another electronic device, that presents images of the media content on a display.

In an embodiment, the trustlet application may be pre-programmed to identify each unit of media content in the media content that is being shared by a sharing application on the host communication device. In some non-limiting examples, a unit of media content may include one POWERPOINT slide from a multiple POWERPOINT slide presentation, one pdf page of a multi-page ADOBE ACROBAT pdf document, one video frame of a multiple frame video, or a similar unit of content in a multi-page document of a productivity software. The trustlet may communicate with the sharing application using an application programming interface (API) of the sharing application to receive information indicating the next unit of media content to be outputted by the sharing application to the CPU or the GPU. In an example of a POWERPOINT application, the trustlet application would receive a slide number of a presentation that is to be outputted to the CPU or the GPU. The trustlet application may obtain the identifying information of the endpoint communication devices for the web session to identify one or more endpoint communication device that is not authorized to view the next unit of media content that will be displayed. The trustlet application may communicate with the CPU or the GPU of non-qualified endpoint communication devices to obfuscate the image that is to be transmitted to these endpoint communication devices.

The host communication device includes a central processing unit (CPU), a graphics processor unit (GPU), a memory, and a display. The host communication device may share sensitive corporate information in media content with endpoint communication devices via a network connection. The memory comprises a sharing application and a trustlet application. In an embodiment, the sharing application may be executed in a TSZ execution mode to share media content with endpoint communication devices. The media content may include confidential information. The host communication device may send an executable of a trusted application to respective endpoint communication devices that are participating in a web conference session with the host communication device for installation of the trusted application prior to allowing the endpoint communication device to join the web conference session. The host communication device sends instructions/commands to the endpoint communication devices that cause the GPU of the endpoint communication devices to obfuscate the confidential information that is displayed on a display of the endpoint communication devices. The host communication device sends instructions/commands to the endpoint communication devices that cause the CPU of the endpoint communication devices to disable functions that allow screen capture or screen snipping at the endpoint communication devices. Thus, a security framework with a secure screen mode may be provided inside the host communication device. Multiple endpoint communication devices may have different access privileges and would be controlled to display one or more portions of the media content according to the access privileges. Further, securing the trustlet application behind a hardware root of trust (or within a trusted execution environment) prevents malware or other viruses from corrupting the software code of the trustlet application. While the system disclosed herein protects confidential corporate information, it is to be appreciated that the system disclosed herein may be used to protect a broad range of confidential information such as organizational data for non-profit organizations, schools, governments, or the like. A trusted security zone (TSZ) provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both fixed and wireless (mobile) hardware architecture designs. Providing the trusted security zone in the main communication device chipset and protecting the hardware root of trust removes the need for separate secure hardware to authenticate the device or user. To ensure the integrity of the applications requiring trusted data, such as a trustlet application in a system for sharing confidential information with endpoint communication devices, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile communication device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which is being incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone (TSZ) is implemented by partitioning all of the hardware and software resources of the mobile communication device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The TSZ is implemented by partitioning the hardware and software resources to exist in a secure subsystem which is not accessible to components outside the secure subsystem. The TSZ is built into the processor architecture at the time of manufacture through hardware logic present in the trusted security zone which enables a perimeter boundary between the secure partition and the normal partition. The TSZ may only be manipulated by those with the proper credentials and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the TSZ by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The TSZ runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the TSZ and thus preserves the trust of the device. The security of the system is achieved at least in part by partitioning the hardware and software resources of the user equipment, so they exist in one of two partitions, the secure partition for the security subsystem and the normal partition for everything else. Placing the TSZ in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile communication device which may execute in the normal partition operating system described above. The TSZ runs a separate operating system for the secure partition that is installed by the mobile communication device manufacturer or vendor, and users are not able to install new applications in or alter the contents of the TSZ.

The disclosure teaches at least one particular technical solution to a technical problem. The system taught herein executes a trustlet application at host communication device/host user equipment (UE) to provide discretionary control of confidential information to endpoint UE over a network during a conference session. In conventional web conference sessions, confidential information may be included in media content that is shared by a host user at a host UE with participant users at endpoint UEs. The participant users may include non-qualified users who should not be viewing the confidential information. However, the host UE may not be able to selectively control which participant users at endpoint UEs can view the confidential information as the confidential information is part of information in the media content. As such all participant users may be able to view the confidential information. The confidential information may also be copied for dissemination outside the web conference session. However, the system taught herein initiates a trustlet application to execute in a trusted security zone (TSZ) execution mode on the host communication device during the web conference session. The trustlet application transmits an executable of a trusted application to the endpoint communication devices during the web conference. Confidential information may be shared using a sharing application. During the web conference, the trustlet application monitors the sharing application to determine the media content being presented/shared. The trustlet application may send instructions/commands to the trusted application at endpoint communication devices to control the CPU and the GPU at the endpoint communication devices during the web conference session that instruct the GPU to obfuscate one or more pages of a document/presentation comprising confidential information for non-qualified participant users being displayed at the endpoint communication device, instructs the CPU to disable screen capture utilities or other snipping utilities, and instructs the GPU to insert watermarks into each page comprising the confidential information. In an embodiment, the host UE may insert the watermark in the media content prior to transmitting the media content to the endpoint UEs. Further, using a trustlet application in a TSZ execution mode and installing a trusted application at endpoint UEs may allow the host UE to control how the confidential information is shared/presented at the various endpoint UEs, thereby readily providing security when any sharing application may be used to share information and when one or more endpoint UEs may not have hardware root of trust. The system taught herein allow users to communicate data to remote participant users without needing to program each sharing application that may be used.

Turning now to FIG. 1, a communication system 100 is described according to an embodiment. In an embodiment, the communication system 100 is configured to provide a secure screen mode in a TSZ execution mode of a host communication device/user equipment (UE) in order to selectively control viewing and copying of corporate information at endpoint communication devices/UEs. The communication system 100 comprises user equipment (UE) 102, cell site 118, network 120, server 122, and endpoint UEs 126A-126N.

UE 102 includes an antenna 101, a cellular radio transceiver (shown as "cellular XCVR") 104, a central processing unit (CPU) 106, a graphics processor unit (GPU) 108, a memory 110, and a display 112. The UE 102 is a host communication device and may be a fixed communication device or a mobile communication device such as a mobile phone, a smart phone, a personal digital assistant (PDA), a wearable computer, a headset computer, a laptop computer, a notebook computer, or a tablet computer. The UEs 126A-126N can have a substantially similar architecture as the architecture of UE 102. A host user of UE 102 may present information that is shared with participant users via a sharing application of the UE 102 during a web conference. A participant user is a participant to the web conference (e.g., an employee of an organization, an independent contractor) that is invited by the host user to participate in the web conference and is either a qualified participant user or a non-qualified participant user. Participant users of the web conference can view the information being shared via a sharing application on a respective UE 126A-126N. The UE 102 may share sensitive corporate information in media content with endpoint UE 126A-126N via a network connection. For instance, the UE 102 can establish a radio communication link to a cell site 118 according to one or more of a fifth generation (5G) communication network, long-term evolution (LTE), a code division multiple access (CDMA), or a global system mobile communications (GSM) so as to communicate with UE 126A-126N via network 120. The UE 102 may establish a radio communication link to the cell site 118 using a 5G telecommunication protocol. The cell site 118 provides connectivity of the UE 102 to the network 120. In an embodiment, the UE 102 can comprise a WiFi radio transceiver 123 that may establish a wireless link to a WiFi access point (not shown), and the WiFi access point may communicatively couple the UE 102 to the network 120 to communicate media content with endpoint UE 126A-126N. The network 120 comprises one or more private networks, one or more public networks, or a combination thereof. The system 100 comprises any number of UEs 102, any number of UE 126A-126N, and any number of cell sites 118.

The antenna 101 may communicatively couple the UE 102 to the cell site 118 through a wireless connection. The antenna 101 may include radio frequency (RF) reception and transmission components of the UE 102. In an embodiment, the antenna 101 may be part of the cellular radio transceiver 104. In an embodiment, the cellular radio transceiver 104 includes RF components to establish a radio communication link to the cell site 118 by transmitting and receiving wireless (RF) signals using the antenna 101. The radio communication link may be established according to a LTE protocol, a CDMA protocol, a GSM protocol, or a 5G telecommunication protocol. While not shown in FIG. 1, the cellular radio transceiver 104 may include additional circuit components to process and manipulate the wireless signals at the UE 102. The central processing unit (CPU) 106 may execute a computer program or application. The CPU 106 is configured to be capable of executing instructions or code of an operating system of the UE 102. Further, the CPU 106 may execute software or firmware stored in the memory 110. During execution, an application may load instructions into the CPU 106, for example load some of the instructions of the application into a cache of the CPU 106. In some contexts, an application that is executed may be said to configure the CPU 106 to do something, e.g., to configure the CPU 106 to perform the function or functions promoted by the subject application. The GPU 108 is an electronic circuit that may be capable of executing instructions for displaying graphical images for output on display 112. The GPU 108 is configured to execute instructions in a TSZ execution mode such as instructions for a sharing application 114 or trustlet application 116.

The memory 110 comprises a non-transitory portion that embeds one or more applications in a hardware root of trust that is executed in a secure execution environment. In embodiments the memory 110 includes the sharing application 114 and the trustlet application 116. In an embodiment, the sharing application 114 may be executed in a TSZ execution mode to share media content with endpoint UEs 126A-126N. The media content may include one or more units of confidential information. In an embodiment, the trustlet application 116 may be executed in a TSZ execution mode that communicates with the sharing application 114 using an application programming interface (API) of the sharing application 114 to receive information indicating the page number of the media content outputted by the sharing application 114. In other embodiments, the information for the page number may be stored at the trustlet application 116. The trustlet application 116 may send an executable of a trusted application such as trusted application 128A-128N to a respective endpoint UE 126A-126N that is participating in a web conference session with UE 102. The executable of the trusted application 128A-128N is installed in order to connect the endpoint UEs 126A-126N to the web conference session. The trustlet application 116 may communicate with the UEs 126A-126N to obtain UE identification information including media access control (MAC) addresses and internet protocol (IP) addresses of the UE 126A-126N. In this way, the UE 102 may receive the identities of the UEs 126A-126N that are authorized to participate in the web conference. Using the IP and MAC addresses, the trustlet application 116 sends instructions/commands to the trusted application 128A-128N that cause the GPU of the endpoint UEs 126A-126N to obfuscate the confidential information that is displayed on a display of the endpoint UEs. In an embodiment, the trustlet application 116 sends instructions/commands to the trusted application 128A-128N that cause the CPU of the endpoint UEs to disable functions that allow screen capture or screen snipping at the endpoint UEs. The UE 102 may use the sharing application 114 to schedule a web conference session with UE 126A-126N by sending a meeting request directly to the UE 126A-126N or, alternatively, to server 122 which then redirects the meeting request to UE 126A-126N.

Figure 2:
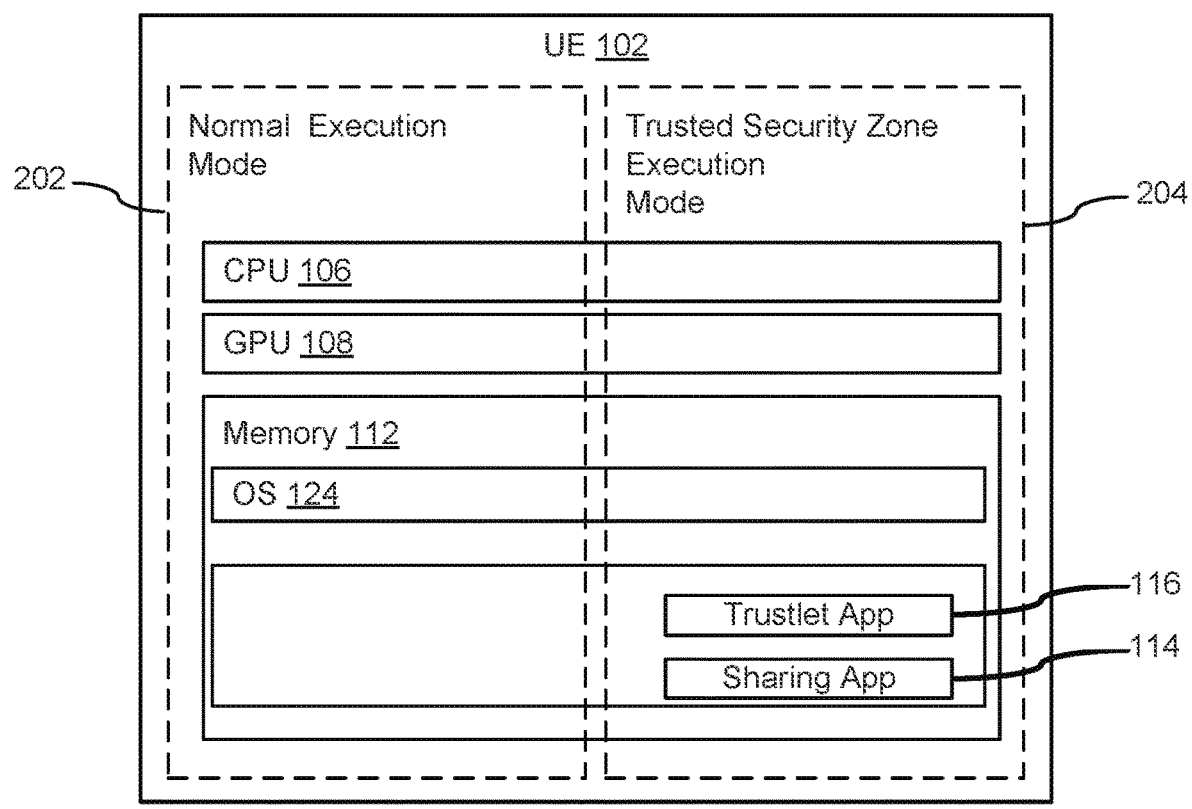
FIG. 2 is a block diagram of a communication device according to an embodiment of the disclosure.

Turning now to FIG. 2, the UE 102 is described according to an embodiment. In an embodiment, an operating system (OS) 124 may be stored in the memory 112. In an embodiment, the memory 112 may comprise a portion associated with the normal execution mode 202 and a portion associated with the trusted security zone (TSZ) execution mode 204. The CPU 106 is configured to be capable of executing instructions in either the normal execution mode 202 or the TSZ execution mode 204. In the normal execution mode 202, the CPU 106 may execute instructions or code of the OS 124. When the OS kernel 124 (or a selection of instructions of the OS 124) is executed in the normal execution mode 202, the OS Kernel 124 may perform operations such as, for example, operations to manage input/output data requests to the UE 102 (e.g., from software and/or an application), translate the requests into instructions (e.g., data processing instructions) for execution by the CPU 106 or other components of the UE 102, manage the UE 102 resources, such as the CPU 106, and the memory 112 when executing and providing services to applications on the UE 102.

In an embodiment, the GPU 108 may execute instructions of the sharing application 114 in the TSZ execution mode 204 to share media content during a web conference session. In an embodiment, the sharing application 114 may facilitate invoking a trustlet application 116 to be executed in parallel by the GPU 108 or the CPU 106 in the TSZ execution mode 204. In another embodiment, the UE 102 executes instructions of the sharing application 114 in a digital signal processor (DSP) of the UE 102, in a field programmable gate array (FPGA) of the UE 102, or in an application integrated circuit (ASIC) of the UE 102. In an embodiment, the trustlet application 116 may execute in parallel to monitor the processes of the GPU 108 at the host UE 102 during the web conference session. The trustlet application 116 may send commands to the trusted applications at endpoint UEs to obtain UE identification information of the endpoint UEs 126A-126N during the web conference session. The trustlet application 116 may send commands/signals to a trusted application executing at a non-qualified endpoint UE to instruct its GPU to obfuscate (e.g., blur, make unreadable, black out, blank out, make unclear, or make unreadable) a page that includes confidential information when the trustlet application 116 determines that the endpoint UE 126A-126N is a non-qualified endpoint UE. Further, the trustlet application 116 may send control commands to the endpoint UEs 126A-126N to selectively control the CPU and the GPU at the endpoint UEs when confidential information is being presented at the UE 102. In embodiments, the control commands to the endpoint UEs 126A-126N include control commands to the endpoint UEs 126A-126N that cause the CPU and/or the GPU to obfuscate confidential information that is displayed on a display device at one or more endpoint UEs, insert watermarks into the media content at the host UE or at one or more endpoint UEs, and disable certain functions of one or more endpoint UEs.

Figure 3:
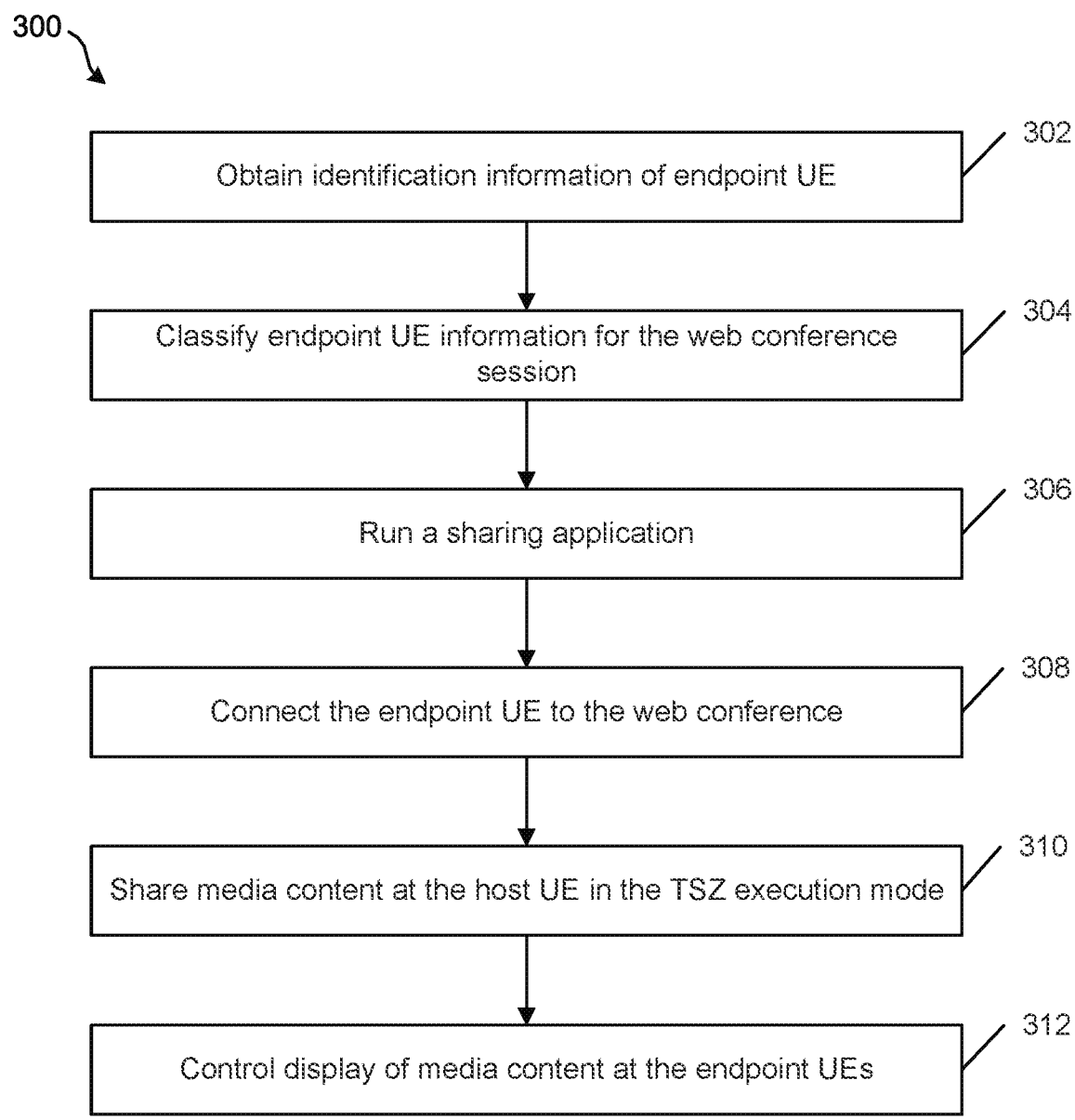
FIG. 3 is a flow chart of a method according to an embodiment of the disclosure.

Turning now to FIG. 3, a method 300 is described. In an embodiment, the method 300 may be implemented by a host UE for providing a secure screen mode that selectively shares, for example by a UE 102 executing the sharing application 114, confidential information with endpoint UE during a conference session. The host UE may be the UE 102 and the endpoint UE may be the UE 126A-126N in FIG. 1.

At block 302, the method 300 comprises obtaining UE identification information of endpoint UEs at the host UE. In an embodiment, the UE identification information may include an IP address of the endpoint UE, a MAC address of the endpoint UE, and/or of the processors on the endpoint UE. The endpoint UEs are associated with invited participant users of the web conference. For instance, a host user of the host UE may invite participant users to the web conference at a predetermined time period by transmitting a meeting invitation/request over a network connection using a sharing application. The host user may execute instructions for the sharing application of the host UE to transmit the request. The sharing application may be a web conference application, a video conference application, or other similar conference application such as, for example, Cisco® Webex®, Zoom®, Skype®, or the like that is executed by the CPU or the GPU at least in part, in a TSZ execution mode. In some non-limiting examples, the host UE may use an application programming interface (API) of the sharing application to embed an executable of a trusted application in the transmission request. The executable of the trusted application may be an executable version of a viewing trusted application or an executable version of a screening trusted application. Each endpoint UE may either receive the viewing executable version of the trusted application or a screening executable version of the trusted application based on the identity of the invited participant users at the endpoint UE. In embodiments, the transmission request may be sent directly from the host UE to the endpoint UEs or may be sent from the host UE to a conference server or a mail server, which then redirects the transmission request to the endpoint UEs. The identity of the invited participant user may be predetermined by the host user as qualified participant users or non-qualified participant users. Accepting the meeting request may cause a meeting link with the trusted application to be stored on the endpoint UE. In an embodiment, the host UE may receive a transmission response from the endpoint UEs when the invited participant users associated with the endpoint UEs accept or reject the meeting request. The transmission response may include the IP addresses of the endpoint UE, the MAC addresses of the endpoint UE, processor resources on the endpoint UEs, or the like.

At block 304, the method 300 comprises classifying the IP address and the MAC address of the UE endpoint devices according to the predetermined status of the participants. In an embodiment, the host user at the host UE may classify the endpoint UEs according to the IP addresses and the MAC addresses that are received from the endpoint UEs. The endpoint UEs associated with qualified participant users can be classified as qualified endpoint UEs, and endpoint UEs associated with non-qualified participant users can be classified as non-qualified endpoint UEs. The endpoint UEs can be classified for each individual web conference session that is initiated by the host user at the host UE. The host UE may store the IP address and the MAC addresses of the endpoint UEs locally in memory at the host UE. For example, the host user may cause an association between the IP and/or MAC addresses and endpoint UE classification to be stored in memory.

At block 306, the method 300 comprises running a sharing application on the host communication device. In an embodiment, the sharing application is executed by the CPU or the GPU in a TSZ mode on the host UE. Further, running the sharing application invokes instructions to execute a trustlet application that is executed in parallel by the GPU or the CPU in the TSZ execution mode.

In embodiments, the trustlet application is preprogrammed with rules for each individual web conference session. The rules determine whether the trustlet sends commands/instructions to the trusted applications at endpoint UEs. The commands control one or more functions of the CPU and the GPU at the endpoint UEs while the media content is being presented at the host UE during the web conference session. The rules define access privileges that permit whether the media content may be viewed and/or copied by an endpoint UE. Access privileges may be general access privilege for all endpoint UEs or special access privileges for qualified endpoint UE. As used herein, general access privilege is a viewing and/or copying privilege where all endpoint UEs may view and/or copy non-confidential information in the image of the media content that is being shared/displayed at the host UE. A special access privilege is a viewing and/or copying privilege where confidential information in the media content being presented at the host UE would be obfuscated at a display of a non-qualified endpoint UE, but would be displayed at a display of a qualified endpoint UE.

In an example, in a multi-page document that is displayed on a host UE with two units of confidential information, the rules would prevent displaying the two units at the display of the non-qualified endpoint UE. In another embodiment, the trustlet application can use a preprogrammed rule to cause one or more GPUs at qualified endpoint UEs and non-qualified endpoint UEs to display a watermark/overlay that is inserted in the media content. In another embodiment, the trustlet application may use the preprogrammed rule to insert a watermark/overlay in the web content at the host UE prior to transmitting the media content to qualified endpoint UEs and non-qualified endpoint UEs. In embodiments, the preprogrammed rule can cause the watermark/overlay to be inserted into the media content at the host UE, to be inserted into the media content at the endpoint UEs, or a combination of both where different portions of the watermark may be inserted at the host UE and the endpoint UEs. A watermark can be information embedded in the digital data representing a shared screen that would be clearly identifiable by an appropriate analysis tool as a watermark while yet being invisible to the human eye.

In an embodiment, participant users viewing the media content at qualified endpoint UEs and non-qualified endpoint UEs would see the watermark on the web content being displayed on the display screen. In embodiments, the watermark may be an IP address, and/or a MAC address of the endpoint UE, text information representing the author of the web content, text information identifying the information to be confidential, and/or other warnings or notices to indicate that the media content was copied without approval. In other embodiments, participant users at qualified endpoint UEs would not see a watermark on the display. In other embodiments, qualified endpoint UEs and non-qualified endpoint UEs may display a watermark/overlay on the web content. In embodiments, the watermark may be a forensic watermark that is not viewable and/or discernable to a human eye on the display. For instance, the watermark may be a pattern of pixel errors in the image being shared by the host UE such that a human eye would not pick out the error, for example, 100 pixels in the image blacked out from the total number of pixels (e.g., 1024×726 pixels). Another watermark may be a color shift for a subset of pixels for a corporate logo (e.g., a "T-Mobile" logo) over the entire set of pixels in the image. For instance, the color shift can be a shift in RGB color codes in an image for a subset of black pixels having RGB color code 0,0,0 to grey pixels having RGB color code 128, 128, 128 that is not discernable to the human eye such that if the image is analyzed with an optical filter, a user would see a "T-Mobile" text in the middle of the screen display. However, the watermark can be displayed in a still image that is obtained with a camera of a smart phone viewing the display. The watermark can be used for forensic purposes to identify a qualified participant user that evaded restrictions on using a screen share utility by taking a photo with their phone or other digital camera and shared or attempted to share the confidential information without approval. Any unauthorized photo would have the watermark and can be used for forensic purposes to identify the unauthorized distributor of the information in the image. For instance, the IP/MAC addresses would be used to identify the qualified participant user if the qualified participant user obtains a photo with the confidential information and disseminates it without approval.

At block 308, the method 300 comprises connecting the endpoint UEs to the web conference session. In an embodiment, the host UE may connect the endpoint UEs to the web conference session when a participant user at the endpoint UE selects the stored meeting link to join the web conference. The meeting link includes executable instructions for the trusted application that is configured to be executed by the CPU or the GPU in order to connect the endpoint UE to the host UE during the web conference session. The meeting links may include either an executable version of the viewing trusted application or an executable version of a screening trusted application. The executable instructions can be executed by the CPU or the GPU at the endpoint UE when selected by the participant user of the endpoint UE. Once the installation is complete, the endpoint UEs are connected to the host UE for participating in the web conference session. In embodiments, the endpoints may connect to the web conference session in a video mode or an audio mode based on the processing capabilities of one or more of the CPU and the GPU at the endpoint UEs. In a video mode, video data and audio data are received and outputted on the endpoint UE. In an audio mode, only audio data is received and outputted on the endpoint UE.

At block 310, the method 300 comprises presenting the media content at the host UE for sharing the media content with the endpoint UEs. In an embodiment, the GPU of the host UE may execute a presentation application in the TSZ mode to display media content on a display of the host UE. In other embodiments, the sharing application may display the media content without executing a presentation application.

At block 312, the method 300 comprises selectively controlling the sharing of media content at the endpoint UEs by the trustlet application based on the status of the endpoint UEs. The status of the endpoint UEs may be a non-qualified endpoint UE and a qualified endpoint UE. In an embodiment, the trustlet application may send interrogation/communication messages to the endpoint UEs to obtain identification information of the endpoint UEs during the web conference session. In embodiments, the trustlet application may send transmission control protocol (TCP) messages to the trusted applications at endpoint UEs. In an embodiment, the interrogation message may be sent to the trusted application. The identification information may include an IP address, a MAC address, CPU state, and GPU state of the endpoint UEs. The IP/MAC addresses can be used by the trustlet application to identify qualified endpoint UEs and non-qualified endpoint UEs based on the stored association between the IP and/or MAC addresses and endpoint UE classification.

In an embodiment, IP/MAC address of endpoint UEs associated with qualified users in the endpoint UE classification may be identified as non-qualified endpoint UEs if the endpoint UE is not capable of execution in a TSZ execution mode. In an embodiment, the trustlet application at the host UE may handshake with or otherwise communicate with the endpoint UE to pre-arrange for the endpoint UEs to handle the forthcoming transmission of media content from the first UE in the TSZ of the endpoint UEs. This handshaking may comprise the host UE validating the trusted status of the endpoint UEs. Said in other words, the handshaking may promote the host UE evaluating whether the endpoint UEs are configured to support the trusted end-to-end communication link. There could be some sort of handshake that occurs between the host UE and the endpoint UEs to confirm TSZ capability at the endpoints before establishing the sharing session. Any endpoint UE that does not have TSZ capability may be identified as a non-qualified endpoint UE and the trustlet application may send commands/signals to the non-qualified endpoint UEs that cause the CPU and/or the GPU at the non-qualified endpoint UEs to obfuscate confidential information and disable screen capture utilities.

In an embodiment, the trustlet application may determine the page of the media content that is presented at the host UE. In an embodiment, the trustlet application executes in parallel on the host UE to monitor the currently running processes of the GPU during the web conference session. In an embodiment, the trustlet application may use an API to send commands to the presentation application to obtain a page number of media content that is being displayed and/or a page number of media content that is to be outputted by the presentation application to the GPU. In other embodiments, the trustlet application may compare a hash value of a unit of media content with predetermined hash values for each unit of the media content stored in memory of the host UE to identify the page of the web content. In other embodiments, the trustlet application may inspect a memory buffer of the GPU to obtain the page information that is displayed.

In an embodiment, the trustlet application may selectively control the CPU and the GPU at the endpoint UEs to obfuscate confidential information being displayed at one or more endpoint UEs, insert watermarks into the media content at one or more endpoint UEs, and disable functions associated with copying a unit of media content that is displayed on a display device of the endpoint UE such as screen capture, screen snip, print screen, and similar copying functions. For instance, the trustlet application may use the IP address and the MAC address of the endpoint UEs to identify qualified endpoint UEs and non-qualified endpoint UEs. The trustlet application may send commands/signals to the trusted application of non-qualified endpoint UEs to execute instructions by the CPU and the GPU during the web conference session. For instance, the trustlet application may send commands when confidential information is being presented/shared on the host UE. In some embodiments, the commands to the trusted application of non-qualified endpoint UEs include disabling a screen capture utility and a snipping utility by the CPU, commands to the GPU to obfuscate pages containing confidential information, and commands to the GPU to insert a watermark/overlay into a page that does not include confidential information. The trustlet application may send commands/signals to the trusted application of qualified endpoint UEs to execute instructions by the CPU and the GPU during the web conference session. In some embodiments, the commands include inserting a watermark/overlay into one or more pages of the web content. In other embodiment, the trustlet application may not send commands to insert watermark into the media content being displayed on the qualified endpoint UEs.

In an embodiment, the trustlet application may request confirmation from trusted applications at non-qualified endpoint UEs that the CPU and the GPU at non-qualified endpoint UEs are implementing the commands/signals sent by the trustlet application. For instance, the trustlet application can transmit requests to trusted applications at non-qualified endpoint UEs during the web session. The transmitted requests may request a confirmation message to be sent back from the trusted applications during the web session that the trusted application can control the CPU and the GPU during the web session. For instance, the confirmation message may request the trusted applications at respective non-qualified endpoint UEs to respond with a confirmation message that the CPU and/or GPUs at non-qualified endpoint UEs are obfuscating confidential information, disabling screen capture utilities, and/or inserting a watermark. If the trustlet application does not receive a confirmation message from each respective non-qualified endpoint UE in response to receiving the request from the trustlet application, the trustlet application may classify the endpoint UE with the non-responsive trusted application as a non-participant endpoint UE during the web session. Further, the trustlet application may prevent further media content from being sent to the non-participant endpoint UE.

In an embodiment, the trustlet application may send obfuscated information to endpoint UEs and request a confirmation that the trusted application is not compromised prior to deobfuscating (e.g., clarify, make understandable or visible) the confidential information. For instance, the host UE may obfuscate confidential information that is sent in the media content prior to transmitting the media content to endpoint UEs. The trustlet application at the host UE may handshake with or otherwise communicate with the endpoint UEs. This handshaking may comprise the host UE validating the trusted status of the endpoint UEs. Any endpoint UE that has TSZ capability and can verify, via a confirmation message to the trustlet application, its TSZ capability may be identified as a qualified endpoint UE. Further, the handshaking may include the trustlet application requesting and receiving a confirmation message back that the trusted application can cause the CPU and/or the GPU at the non-qualified endpoint UEs to deobfuscate confidential information so as to present the confidential information on a display of the qualified endpoint UE. Thus, any attempt to intercept the confidential information or a breach of security at the endpoint device to access the confidential is prevented.

Figure 4:
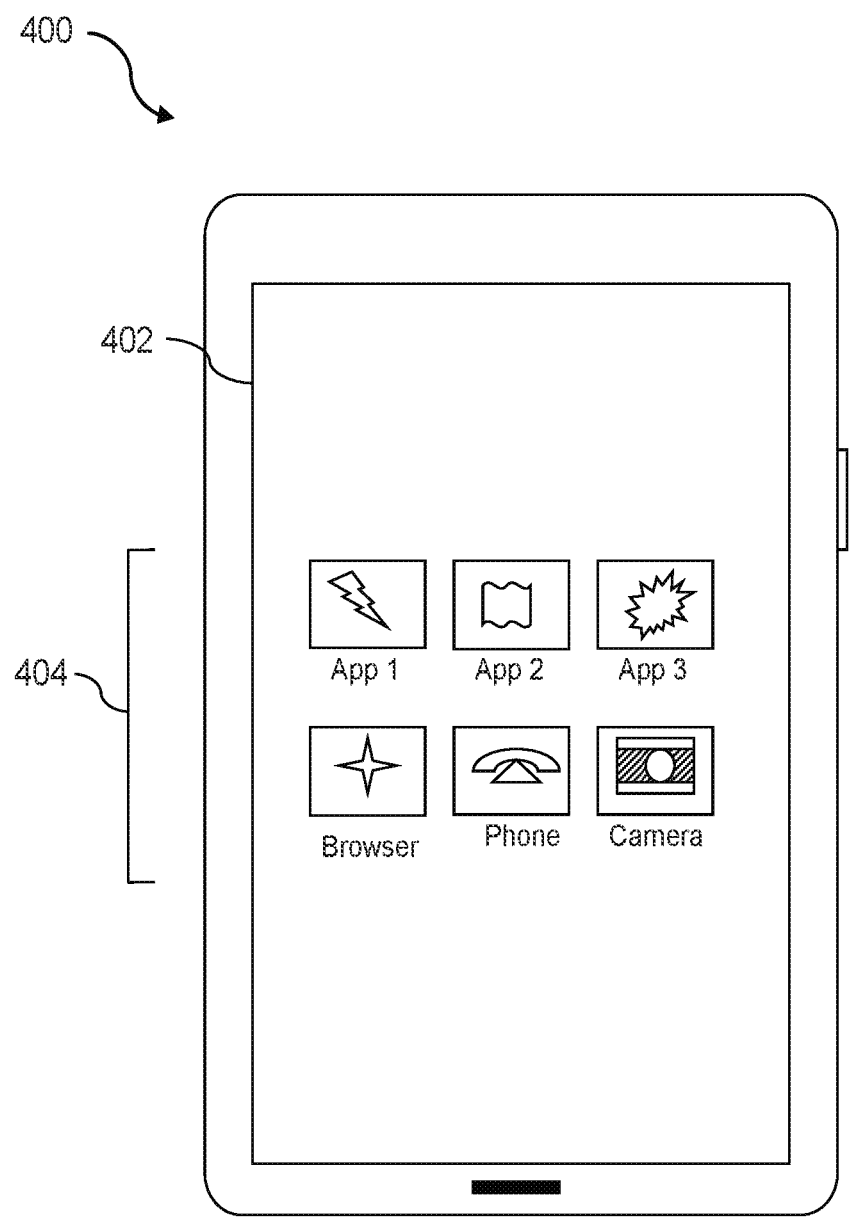
FIG. 4 is an illustration of a communication device according to an embodiment of the disclosure.

FIG. 4 depicts user equipment (UE) 400, which is operable for implementing aspects of the present disclosure (for example, the UE 102 described above), but the present disclosure should not be limited to these implementations. Although UE 400 is illustrated as a communication device, the UE 400 may take various forms including a wireless handset, a wearable computer, a personal digital assistant (PDA), a headset computer, a laptop computer, a notebook computer, and a tablet computer. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
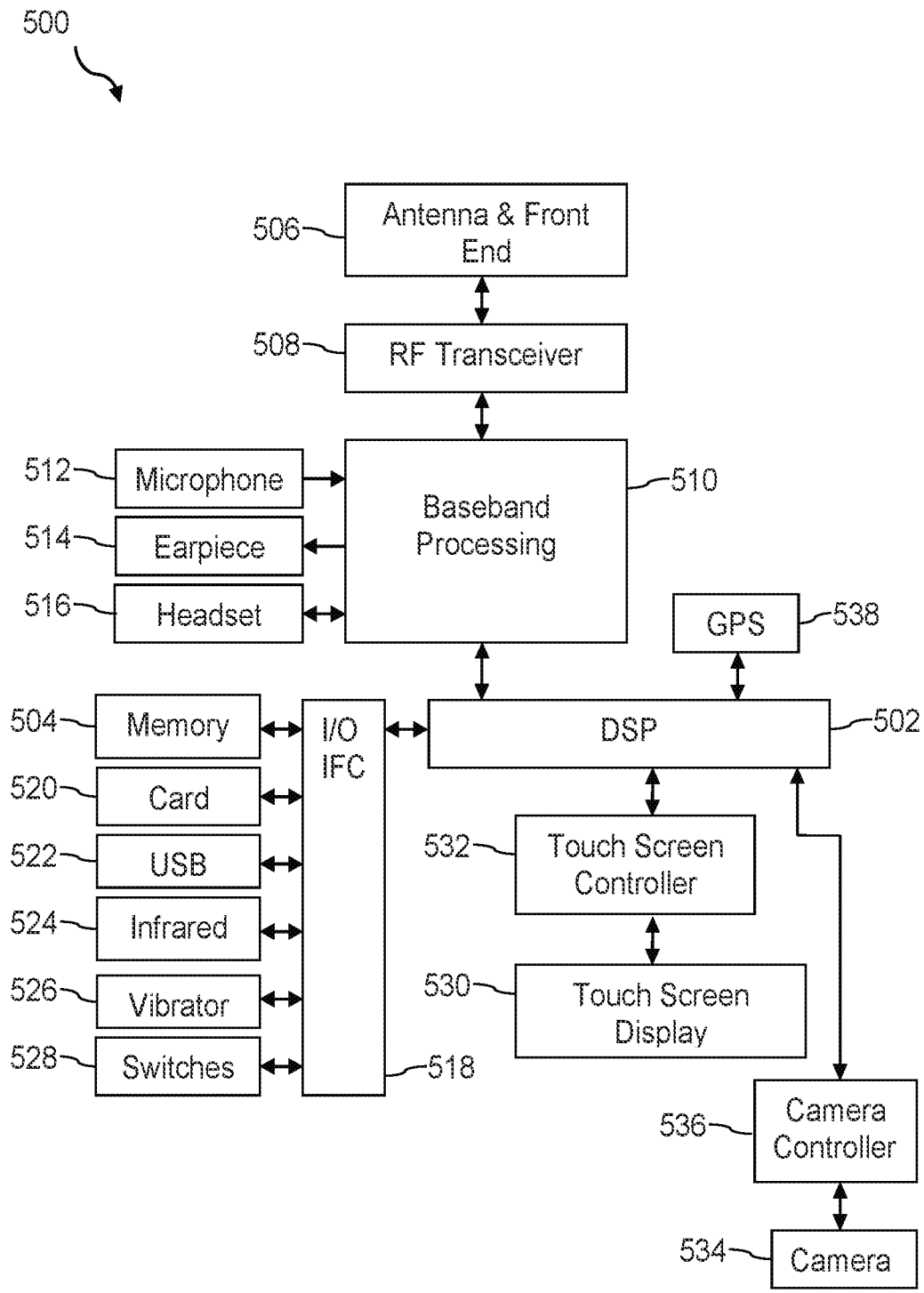
FIG. 5 is a block diagram of a hardware architecture of a communication device according to an embodiment of the disclosure.

FIG. 5 shows a block diagram of the UE 500. In an embodiment, the UE 500 may be used to implement the UE 102 described above. While a variety of known components of communication devices are depicted, in an embodiment a subset of the listed components and/or additional components not listed may be included in the UE 500. The UE 500 includes a digital signal processor (DSP) 502 and a memory 504. As shown, the UE 500 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 500 may include another kind of display that does not provide a touch sensitive screen. In an embodiment, the UE 500 may include both the touch screen display 530 and additional display component that does not provide a touch sensitive screen. In an embodiment, the DSP 502 may communicate directly with the memory 504 without passing through the input/output interface 518. Additionally, in an embodiment, the UE 500 may comprise other peripheral devices that provide other functionality.

The DSP 502 or some other form of controller or central processing unit operates to control the various components of the UE 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 500 to function as a peripheral device to exchange information with a personal computer or other computer system. The infrared port 524 and other optional ports such as a Bluetooth® interface or an IEEE 802.11 compliant wireless interface may enable the UE 500 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, an LTE, a CDMA, a GSM wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 500 may comprise a radio frequency identify (RFID) reader and/or writer device.

The switches 528 may couple to the DSP 502 via the input/output interface 518 to provide one mechanism for the user to provide input to the UE 500. Alternatively, one or more of the switches 528 may be coupled to a motherboard of the UE 500 and/or to components of the UE 500 via a different path (e.g., not via the input/output interface 518), for example coupled to a power control circuit (power button) of the UE 500. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 500 to determine its position. In an embodiment, the UE 500 is the UE 102 of FIG. 1 that may include an appliance such as a smart phone, a wearable computer, a personal digital assistant (PDA), a headset computer, a laptop computer, a notebook computer, and a tablet computer.

Figure 6A:
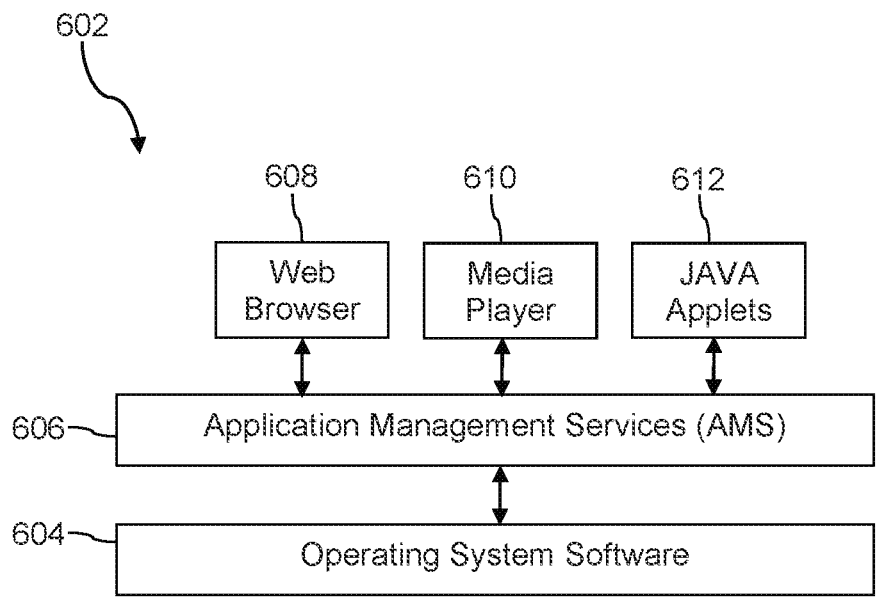
FIG. 6A is a block diagram of software architecture of a communication device according to an embodiment of the disclosure.

FIG. 6A illustrates a software environment 602 that may be implemented by the DSP 502 in FIG. 5. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400 or UE 500. Also shown in FIG. 6A are a web browser application 608, a media player application 610, and JAVA applets 612. The web browser application 608 may be executed by the UE 400 or UE 500 to browse content and/or the Internet, for example when the UE 400 or UE 500 is coupled to a network via a wireless link. The web browser application 608 may permit a user to enter information into forms and select links to retrieve and view web pages. The media player application 610 may be executed by the UE 400 or UE 500 to play audio or audiovisual media. The JAVA applets 612 may be executed by the UE 400 or UE 500 to provide a variety of functionality including games, utilities, and other functionality.

Figure 6B:
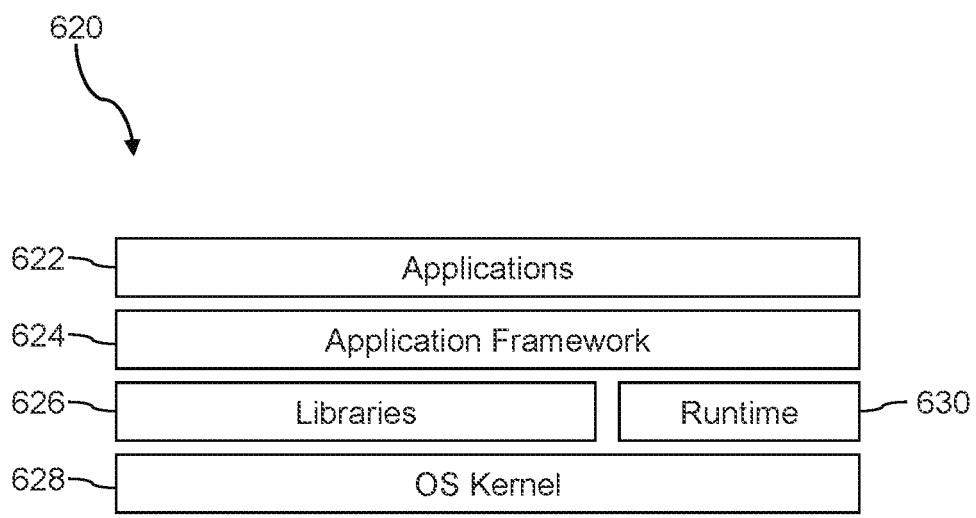
FIG. 6B is a block diagram of another software architecture of a communication device according to an embodiment of the disclosure.

FIG. 6B illustrates an alternative software environment 620 that may be implemented by the DSP 502 in FIG. 5. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
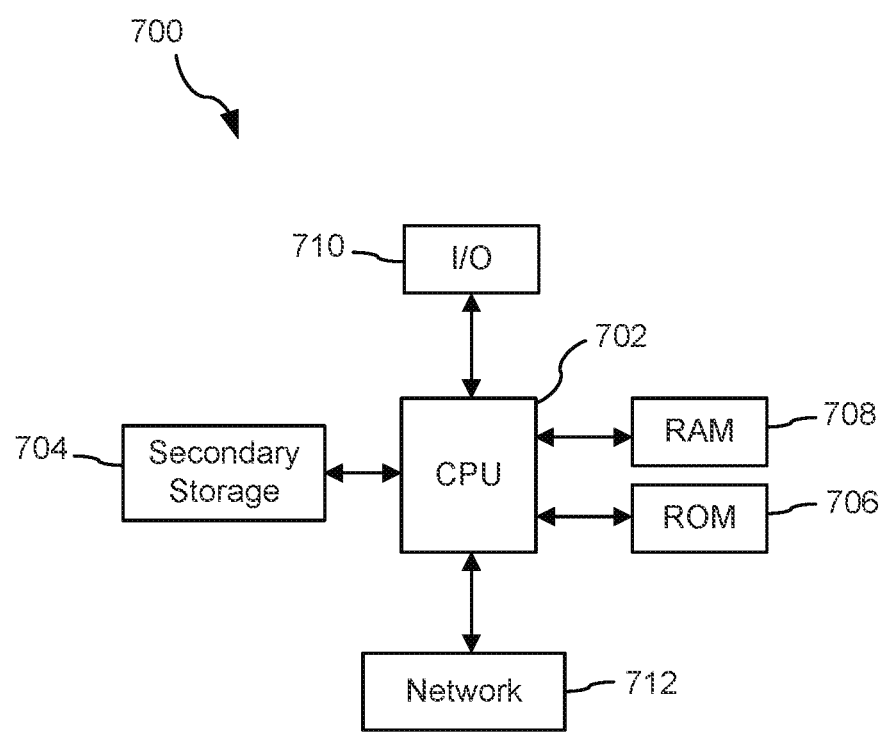
FIG. 7 is a block diagram of a computer system according to an embodiment of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 702 may execute a computer program or application. For example, the CPU 702 may execute software or firmware stored in the ROM 706 or stored in the RAM 708. In some cases, on boot and/or when the application is initiated, the CPU 702 may copy the application or portions of the application from the secondary storage 704 to the RAM 708 or to memory space within the CPU 702 itself, and the CPU 702 may then execute instructions that the application is comprised of. In some cases, the CPU 702 may copy the application or portions of the application from memory accessed via the network connectivity devices 712 or via the I/O devices 710 to the RAM 708 or to memory space within the CPU 702, and the CPU 702 may then execute instructions that the application is comprised of. During execution, an application may load instructions into the CPU 702, for example load some of the instructions of the application into a cache of the CPU 702. In some contexts, an application that is executed may be said to configure the CPU 702 to do something, e.g., to configure the CPU 702 to perform the function or functions promoted by the subject application. When the CPU 702 is configured in this way by the application, the CPU 702 becomes a specific purpose computer or a specific purpose machine.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 712 may provide wired communication links and/or wireless communication links (e.g., a first network connectivity device 712 may provide a wired communication link and a second network connectivity device 712 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as CDMA, GSM, LTE, WiFi (IEEE 802.11), Bluetooth, Zigbee, narrowband Internet of things (NB IoT), NFC, and radio frequency identity (RFID). The radio transceiver cards may promote radio communications using 5G, 5G New Radio, or 5G LTE radio communication protocols. These network connectivity devices 712 may enable the processor 702 to communicate with the Internet or one or more intranets. With such a network connection, it is contemplated that the processor 702 might receive information from the network or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk-based systems may all be considered secondary storage 704), flash drive, ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication device, comprising:
   a central processing unit (CPU);
   a graphics processing unit (GPU); and
   a non-transitory memory comprising executable instructions for a sharing application that, when the executable instructions are executed by at least one of the CPU or the GPU, causes the sharing application to:
   transmit an executable of a trusted application to an endpoint communication device;
   begin execution of the sharing application in a trusted security execution zone (TSZ) execution mode for sharing media content with the endpoint communication device;
   in response to execution of the sharing application, instantiate a trustlet application that begins execution by the CPU or the GPU in the TSZ execution mode;
   display a unit of media content on a display device of the communication device;
   determine whether the unit of media content comprises confidential information; and
   in response to a determination the unit of media content comprises confidential information, transmit one or more commands to the trusted application at the endpoint communication device, wherein the one or more commands is configured to control one or more functions at the endpoint communication device.

2. The communication device of claim 1, wherein the one or more commands instruct at least one of a CPU or a GPU of the endpoint communication device to disable a copying function comprising a function to obtain a screen capture of a display.

3. The communication device of claim 1, wherein the one or more commands instruct at least one of a CPU or a GPU of the endpoint communication device to disable a display function comprising a function to blur out the unit of media content.

4. The communication device of claim 1, wherein the one or more commands instruct at least one of a CPU or a GPU of the endpoint communication device to insert a watermark into the unit of media content at the endpoint communication device.

5. The communication device of claim 1, wherein the trustlet application comprises rules that identify access privileges for the endpoint communication device, wherein the rules are predefined for a web conference session between the communication device and the endpoint communication device, and wherein the access privileges comprise a general access privilege or a special access privilege.

6. The communication device of claim 1, wherein the trusted application is coupled to the trustlet application, and wherein the non-transitory memory comprises further instructions that when executed by the CPU or the GPU cause the trustlet application to:
   transmit an interrogation message to the trusted application at the endpoint communication device that is connected to the sharing application; and
   receive, from the endpoint communication device, identification information of the endpoint communication device in response to transmitting the interrogation message to the endpoint communication device, wherein the identification information comprises at least one of an internet protocol (IP) address or a media access control (MAC) address.

7. The communication device of claim 1, wherein the unit of media content comprises a slide in a presentation document or a page in document file.

8. A method implemented by a communication device, wherein the method comprises:
   transmitting an executable of a trusted application to an endpoint communication device;
   beginning execution of a sharing application in a trusted security execution zone (TSZ) execution mode for sharing media content with the endpoint communication device;
   in response to execution of the sharing application, instantiate a trustlet application that begins execution by a central processing unit (CPU) or a graphics processing unit (GPU) in the TSZ execution mode;
   displaying a unit of media content on a display device of the communication device;
   determining whether the unit of media content comprises confidential information; and
   in response to a determination the unit of media content comprises confidential information, transmitting one or more commands to the trusted application at the endpoint communication device, wherein the one or more commands controls one or more functions at the endpoint communication device.

9. The method of claim 8, further comprising instructing a CPU or a GPU of the endpoint communication device to disable a copying function comprising a function to obtain a screen capture of a display.

10. The method of claim 8, further comprising instructing a GPU or a GPU of the endpoint communication device to disable a display function comprising a function to blur out the unit of media content.

11. The method of claim 8, further comprising instructing a CPU or a GPU of the endpoint communication device to insert a watermark into the unit of media content at the endpoint communication device.

12. The method of claim 8, wherein the trustlet application comprises rules that identify access privileges for the endpoint communication device, wherein the rules are predefined for a web conference session between the communication device and the endpoint communication device, and wherein the access privileges comprise a general access privilege or a special access privilege.

13. The method of claim 8, further comprising:
   coupling the trusted application to the trustlet application;
   transmitting an interrogation message from the trustlet application to the trusted application after coupling the trusted application to the trustlet application; and
   receiving identification information from the trustlet application in response to transmitting the interrogation message to the trustlet application, wherein the identification information comprises at least one of an internet protocol (IP) address or a media access control (MAC) address.

14. The method of claim 8, wherein the unit of media content comprises a slide in a presentation document or a page in document file.

15. A user communication device, comprising:
   at least one of a central processing unit (CPU) or a graphics processing unit (GPU); and a non-transitory memory comprising executable instructions for a sharing application that, when the executable instructions are executed by at least one of the CPU or the GPU, causes the sharing application to:
- receive a communication comprising a meeting request from a host communication device;
- store a meeting link comprising an executable of a trusted application in memory of the user communication device based on selecting the meeting request;
- select the meeting link to instantiate the trusted application at the user communication device;
- receive, from the host communication device, a unit of media content for display on a display device of the user communication device; and
- receive one or more commands in response to receiving the unit of media content, wherein the one or more commands is configured to control one or more functions of at least one of the CPU or the GPU.

16. The user communication device of claim 15, wherein the one or more commands cause the trusted application to instruct at least one of the CPU or the GPU to disable a copying function comprising a function to obtain a screen capture of the display.

17. The user communication device of claim 15, wherein the one or more commands cause the trusted application to instruct at least one of the CPU or the GPU to disable a display function comprising a function to blur out the unit of media content.

18. The user communication device of claim 15, wherein the one or more commands cause the trusted application to instruct at least one of the CPU or the GPU to insert a watermark into the unit of media content that is displayed on the display device of the user communication device.

19. The user communication device of claim 15, wherein the trusted application is coupled to the host communication device, and wherein the non-transitory memory comprises further instructions that when executed by at least one of the CPU or the GPU cause the trusted application to:
- receive an interrogation message from the host communication device; and
- send, to the host communication device, identification information of the user communication device in response to receiving the interrogation message, wherein the identification information comprises at least one of an internet protocol (IP) address or a media access control (MAC) address.

20. The user communication device of claim 15, wherein the unit of media content comprises a slide in a presentation document or a page in document file.

\* \* \* \* \*